United States Patent [19]

Poinsard et al.

[11] 4,112,829
[45] Sep. 12, 1978

[54] APPARATUS FOR PURIFYING CARBON DIOXIDE VAPORS OF FERMENTING LIQUIDS

[75] Inventors: Elisabeth Michéle Poinsard; Robert Gaston Poinsard, both of Le Boucaret, France

[73] Assignee: Establissement Valvin, Vaduz, Liechtenstein

[21] Appl. No.: 732,065

[22] Filed: Oct. 13, 1976

[51] Int. Cl.² ............................................. C12F 3/02
[52] U.S. Cl. ................................... 99/277; 99/323.1; 165/111; 165/178
[58] Field of Search ............ 99/323.1, 323.2, 275–276, 99/277, 277.1, 277.2, 278, 293, 455, 294; 165/111, 174, 178; 202/161, 185, 189, 198; 426/7, 11, 13, 15, 477; 62/54; 220/85

[56] References Cited

U.S. PATENT DOCUMENTS

| | | | |
|---|---|---|---|
| 96,201 | 10/1869 | Clark | 99/277.1 X |
| 206,010 | 7/1878 | Foubert | 99/278 X |
| 1,267,709 | 5/1918 | Straus | 202/198 X |
| 1,658,322 | 2/1928 | Bernard | 202/161 X |
| 1,783,867 | 12/1930 | Vogt | 99/455 X |
| 2,080,370 | 5/1937 | Hauk | 99/455 |
| 2,591,010 | 4/1952 | Rollins et al. | 202/161 |
| 2,753,954 | 7/1956 | Tinker | 165/111 X |
| 2,801,082 | 7/1957 | Shobe | 165/111 X |
| 2,806,676 | 9/1957 | Frenkel | 165/174 X |
| 2,852,042 | 9/1958 | Lynn | 165/174 X |
| 3,182,719 | 5/1965 | Christ | 165/111 |
| 3,791,422 | 2/1974 | Johnson et al. | 62/54 X |

*Primary Examiner*—Harvey C. Hornsby
*Assistant Examiner*—Arthur O. Henderson
*Attorney, Agent, or Firm*—Emory L. Groff, Jr.

[57] ABSTRACT

A condenser, connected to receive carbon dioxide and vapors from a liquid fermenting in a container, comprises reflux tubes with baffles in a unit cooled to about −50° C, whereby the vapors condense, reflux and are collected in a funnel from where they flow down a tube dipping into the fermenting liquid. The purified carbon dioxide passes out through an exhaust pipe and may be solidified.

7 Claims, 3 Drawing Figures

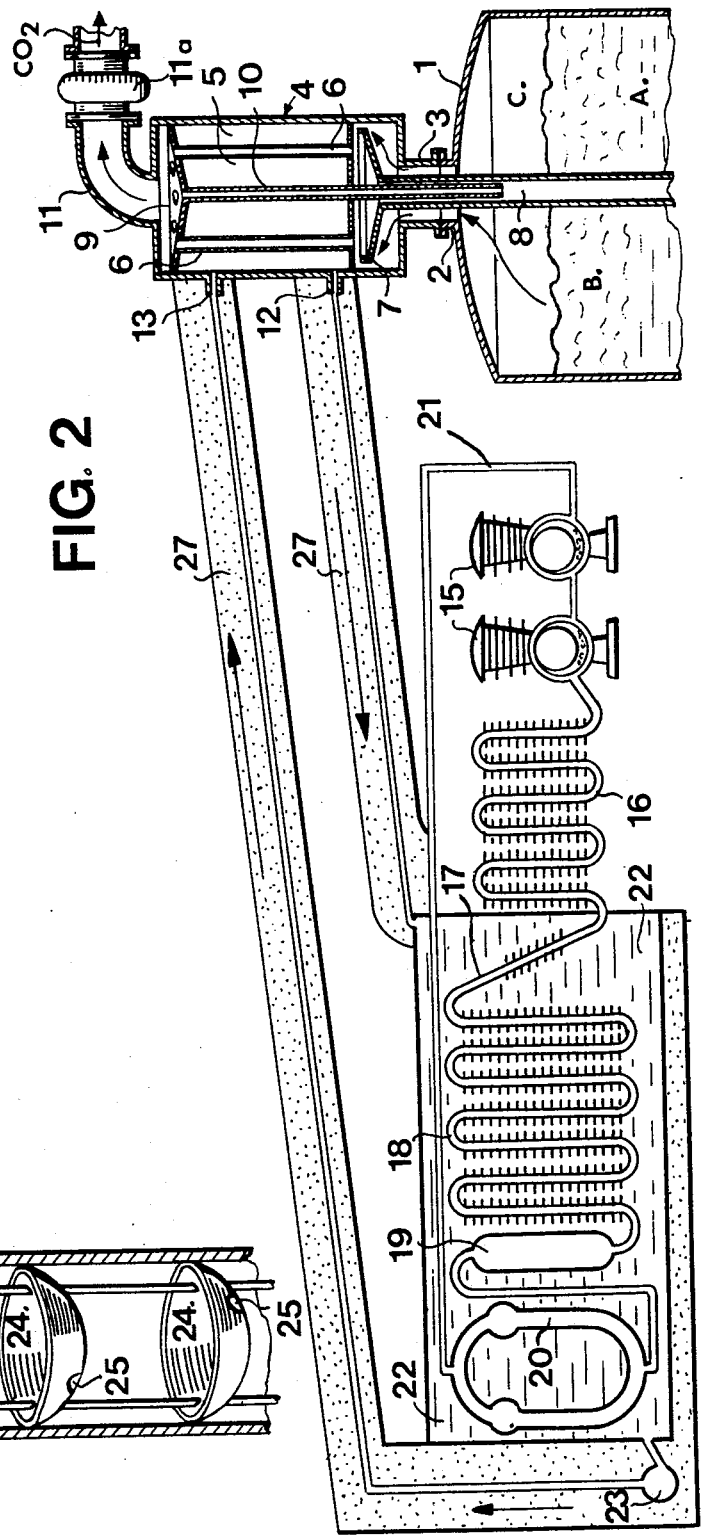

APPARATUS FOR PURIFYING CARBON DIOXIDE VAPORS OF FERMENTING LIQUIDS

The invention relates to the fermentation of liquids and is concerned with an apparatus for the purification of carbonic gas (carbon dioxide) produced in the fermentation of liquids, particularly in very large vinificators and continuous vinificators, and the recovery of vapors such as the superior alcohols and/or so-called Fusel oil contained in the carbonic gas.

During the fermentation of wine, various vapors are drawn off by the carbonic gas.

An aim of the invention is, in contrast to providing a separate extraction of these vapors and especially the superior alcohols, to recuperate and return them to the fermenting liquids to increase their proof by, for example, about 3 or 4 tenths of a degree, and give them a finer aroma.

Another aim of the invention is to purify the carbonic gas produced by fermentation, by the removal of alcoholic vapors and Fusel oil. Hence instead of this carbonic gas being discharged and contributing to atmospheric pollution, it may be recuperated and compressed for industrial use, by cryogenic liquefaction and storage in bottles or tanks.

Apparatus of the type to which the invention relates are particularly useful for very large fermentation plants and continuous vinificators, The invention therefore proposes, in combination with a container of fermenting liquids, notably in a vinificator, a recuperation and carbonic-gas purifying apparatus comprising: a condenser, connected to the container to receive carbonic gas to be purified by the removal of vapors contained therein, for condensing said vapors; means for extracting purified carbonic gas from the condenser; and means for returning the liquid condensate of said vapors from the condenser to the container.

It is possible to equip, for example, a continuous vinification tower with an apparatus according to the invention very simply and at relatively low cost.

The condenser may include a body fixed at the upper end of the container and connected thereto by a dilivery member such as a tube, an inside part of the body, provided with reflux tubes which preferably have baffles, being refrigerated by a refrigerating unit. The returning means may comprise, in a lower part of the body under the reflux tubes, a funnel having a delivery tube dipping into the fermenting liquid in the container, and the extraction means comprise an exhaust tube connected to the upper part of the body to evacuate the purified carbonic gas.

With such an arrangement, purification can be carried out without the reflux tubes of the apparatus being obstructed by residue scrapers turning on the surface of the fermenting liquid in the container.

Preferably, the reflux tubes are contained longitudinally by a cylinder placed inside the aforesaid body, this cylinder being heat-insulated relative to an outer cylindrical wall of the body and refrigerated by the refrigeration unit.

As a result it is possible, by sufficiently lowering the temperature, to rapidly purify the carbonic gas and obtain a practically total condensation of, for example, the wine vapors.

The invention will be described in further detail with reference to the accompanying drawing a preferred embodiment of the invention wherein FIG. 1 is a fragmentary cross-section of a continuous vinification tower with the purifying apparatus according to the present invention mounted on top thereof and being partially in cross-section.

FIG. 2 is a schematic view of a refrigerating unit according to the invention connected to the purifying apparatus.

FIG. 3 is a fragmentary view partially in cross-section showing hemispherical baffles mounted in one of the upright tubes of the purifying apparatus.

Figure 1:
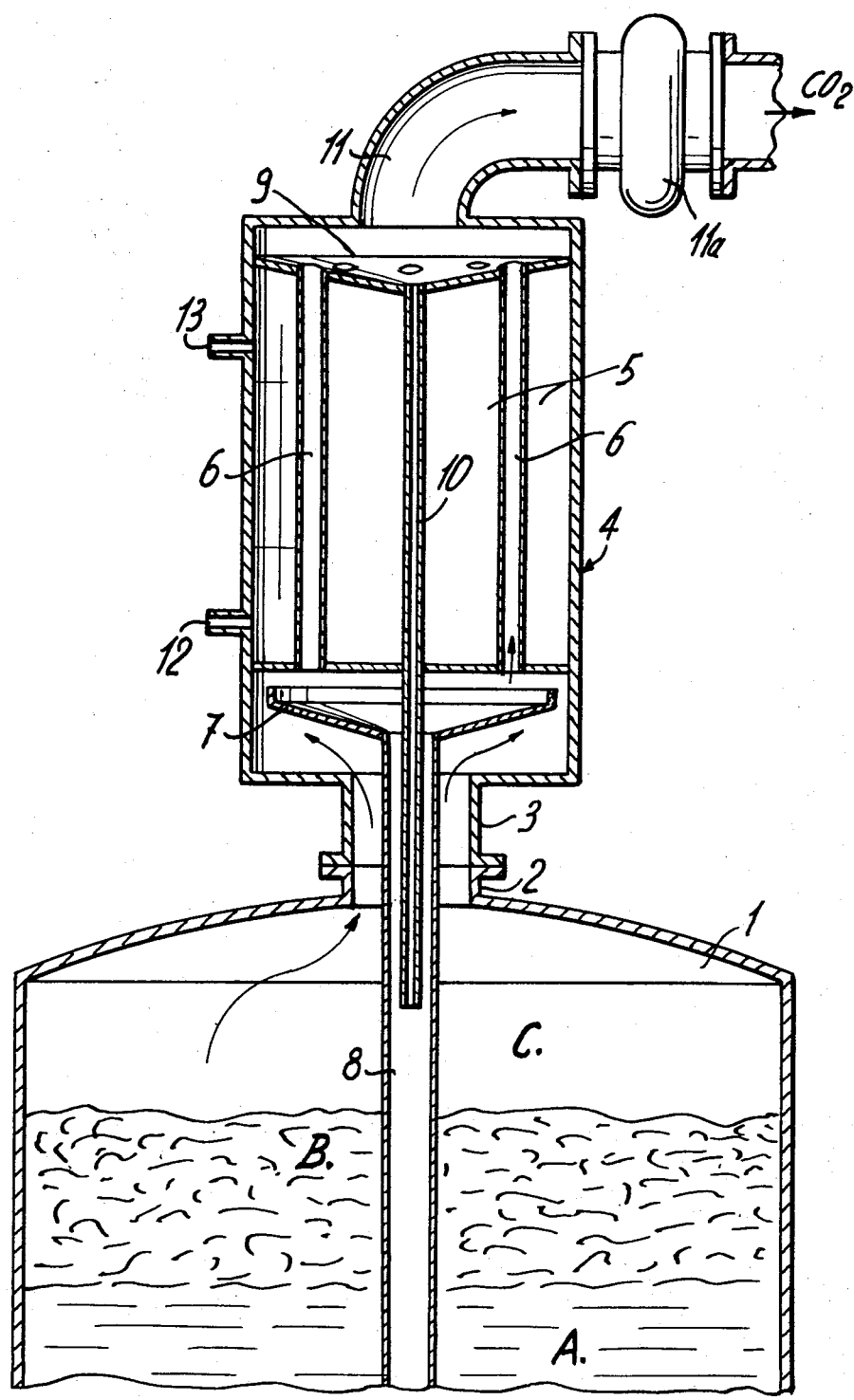

The apparatus shown by way of example in the drawing may be fitted on a continuous vinification tower of 4000 hl capacity, but has the advantage that it may be adapted to different installations by virtue of the position of the tubes for passage of the fermentation gas and reflux of the recuperated alcohols, which tubes are often obstructed by residue scrapers rotating on the liquid surface in vinification towers.

The vinification tower 1 contains a given quantity of wine A on which a layer of residue B floats. The space C in the tower above residue B is filled with a mixture of carbonic gas (carbon dioxide) and wine vapors.

The upper part of tower 1 has a neck 2 connected by flanges to a delivery tube 3 connected to a body 4 of the purifying apparatus.

The delivery tube 3 for the fermentation gases may be in stainless steel and have a diameter of 40 cm. The body 4 is formed of a cylinder of stainless steel 2 meters high and 1.20 meters diameter.

Inside the cylinder forming body 4 is placed another cylinder 5 through which 12 upright tubes 6, of 10 cm diameter and 1.50 meter long, pass. These tubes 6 each have 10 hemispherical baffles 24, with orifices 25 of 2 cm diameter.

FIG. 3 shows the hemispherical baffles 24 spaced on a pair of carrying bars 26, in such a manner that orifices 25 provided sidewise in their bottoms are not in alignment. This assembly permits their introduction into the tubes 6.

The cylinder 5 and tubes 6 form a unit refrigerated to about $-50°$ C. to produce a rapid separation of the carbon dioxide and wine vapors by condensation of the latter.

The cylinders 4 and 5 are preferably coaxial with their common longitudinal axis vertical. The tubes 6 are also vertical and may for example be regularly spaced-apart about the vertical axis.

A funnel 7 of stainless steel is placed below the lower ends of tubes 6, this funnel 7 having a delivery tube 8 which dips into the wine A contained in tower 1.

In the upper part of body 4 is a chamber 9 whose lower part, into which the tubes 6 lead, is frusto-conical. The central zone of this lower frusto-conical part of the chamber 9, forming the summit of the inverted cone, is connected to a return tube 10 serving for the recuperation of the relatively rare condensation products of the chamber 9. This return tube 10 passes down through the body 4 and cylinder 5 along their common vertical axis, and leads into the delivery tube 8. The diameter of tube 10 is, for example, 1 cm.

The upper part of the chamber 9 has an exhaust pipe 11, of 40 cm diameter, which evacuates the purified carbon dioxide towards a storage location or removal means.

Optionally, the exhaust pipe 11 is provided with a pump system 11a.

The body 4 has, leading to the unit containing the baffle tubes 6, an inlet orifice 12 and an outlet orifice 13 for a refrigerant cycled by an external refrigerator unit shown in FIG. 2. The cylinder unit is consequently suitably heat-insulated.

The refrigerating unit comprises two compressors 15 to which carbon tetrafluoride (Freon 14) is fed through pipes 21. The compressed gas is circulated through a heat exchanging unit 22 containing ethylene glycol or methanol which is refrigerated at $-40°$ to $-50°$ C. so as to be used as coolant of the refrigerating unit 4 to which it is circulated through insulated pipes 27 by a pump 23. The freon gas is dehydrated when passing through a dehydrating unit 19 prior to expanding in evaporator 20 and being recirculated through compressors 15 (see FIG. 2).

In normal operation, an ethylene-glycol mixture cooled to $-50°$ C. by the refrigerator unit is circulated in the cylinder assembly containing the baffle tubes 6.

Consequently, the mixture of carbon dioxide and wine vapors delivered to the body 4 passes through the tubes 6 where it is cooled, which condenses the alcoholic vapors and Fusel oil which reflux, in the liquid state, into the funnel 7 and through the delivery tube 8 into tower 1.

When the carbon dioxide reaches the upper chamber 9 of body 4, the rare remaining condensable products are condensed and delivered by the trunco-conical surface to the tube 10 which returns them to tower 1.

Hence, the carbon dioxide delivered via the exhaust pipe 11 is practically pure and, in the installation given by way of example, is delivered at an average rate of approximately 6 liters per second.

Of course, the invention is not limited to the described and illustrated example from which persons skilled in the art will, without departing from the scope of the invention, be able to derive other embodiments, for example for the automatic recuperation of superior alcohols and/or Fusel oil contained in the carbonic gas of all types of fermentation installation.

The apparatus according to the invention enables recuperation of the carbonic gas which is usually discharged and hence wasted by the wine and cider producing industries.

After its purification, the carbon dioxide may be refrigerated and compressed for storage. It is also possible to collect the unrefined fermentation vapors, compress and liquify them for various industrial purposes.

To reduce the sulfur content of wines or cider, it is possible, in their production, to substitute the anti-oxygen action of sulfur dioxide by the anoxygen action of carbon dioxyde, by using a small part of the recuperated carbon dioxide to saturate the receiving recesses, receiving vats, pressurizing, grape-separation and crushing stations and all locations where an intense mechanical turbulence facilitates primary oxidation and consequently the formation of sulfates and a loss of the biostatic action of the sulfur dioxide which combines with air.

One may also automatically introduce solidified purified or non-purified carbon dioxide into the production liquid, as a refrigerant rich in aroma and higher alcohols, for non-purified carbon dioxide, or solely as a refrigerant in the case of purified carbon dioxide.

It is also possible instead of setting up a condenser on each vat or container to connect such a condenser to the trap-doors of several vats. Such an installation enables, by a preestablished rotation with only three or four large-dimension vats, the purification and automatic recuperation of all of the products produced in a very big cave.

To avoid mixing the fermentation vapors and re-incorporation of the condensates of one vat into another, a valve system can be provided on the vat trap-doors leading to the collector.

A set of manometric membranes responsive to the gas pressure in each vat may control electromagnetic valves to selectively direct the reintroduction of the condensates into a particular vat, as a function of the dominant fermentations, without a risk of mixing from one vat to another.

We claim:

1. In combination with a container of fermenting liquids, notably in a vinificator, a recuperation and carbonic-gas purifying apparatus comprising:
   a condenser, connected to said container to receive carbonic gas to be purified by the removal of vapors contained therein, for condensing said vapors;
   a refrigerating unit connected to said condenser, and means for extracting purified carbonic gas from the condenser;
   means for returning the liquid condensate of said vapors from the condenser to the container,
   said condenser comprising a body fixed on and connected to an upper part of the container by a delivery member, said body having an inner part, a series of reflux tubes through which the carbonic gas passes and in which said vapors reflux, said reflux tubes being housed in the inner part of the body and including a plurality of hemispherical baffles vertically spaced on a pair of carrying bars each of said baffles being provided with an orifice, said orifice of adjacent baffles being laterally offset from one another to provide a tortuous path for said vapours within said reflux tubes, and means for circulating a refrigerating fluid from said refrigerating unit to said inner part of the condenser body, said condensate returning means including in a lower part of said body, under said reflux tubes, a funnel having a delivery tube which in use extends into the fermenting liquid in said container, and said extracting means further including an exhaust pipe connected to an upper part of said body to evacuate the purified carbonic gas.

2. An apparatus according to claim 1, in which said returning means further comprise, in an upper part of said body, a chamber having a lower part to which is connected a member for returning liquid to the container.

3. An apparatus according to claim 2, in which said body is cylindrical.

4. An apparatus according to claim 3, in which said reflux tubes are disposed longitudinally in a cylinder placed inside said body, said cylinder forming the refrigerated inner part of said body and being heat insulated in relation to an outer cylindrical wall of said body.

5. An apparatus according to claim 2, in which said chamber in the upper part of the body has a frusto-conical lower part, the summit of the cone being directed downwards.

6. An apparatus according to claim 5, in which said return member is a tube extending into the delivery tube of said funnel for the delivery of condensation products of said upper chamber.

7. An apparatus according to claim 1, in which said refrigerating unit for cooling said inner part of the body delivers a solution of ethylene-glycol at a temperature of about $-50°$ C.

* * * * *